United States Patent [19]

Williams et al.

[11] Patent Number: 5,675,146
[45] Date of Patent: Oct. 7, 1997

[54] NATURALLY OCCURRING RADIOACTIVE MATERIAL CONTAMINATION DETECTION MEANS

[75] Inventors: Thomas Marion Williams; Irwin Ray Supernaw, both of Houston, Tex.

[73] Assignee: Texaco Inc., White Plains, N.Y.

[21] Appl. No.: 526,349

[22] Filed: Sep. 11, 1995

Related U.S. Application Data

[63] Continuation of Ser. No. 950,880, Sep. 25, 1992, abandoned.
[51] Int. Cl.$^6$ .................................................. G01V 5/04
[52] U.S. Cl. ............................................................ 250/256
[58] Field of Search .................................. 250/253, 255, 250/256, 359.1

[56] References Cited

U.S. PATENT DOCUMENTS 3,678,271  7/1972  Groezinger .
4,623,792  11/1986  Böhme et al. .......................... 250/255
5,038,033  8/1991  Carroll et al. .......................... 250/256

OTHER PUBLICATIONS

Smith, "Radioactive-Scale Formation", J. Petroleum Tech., Jun. 1987, pp. 697-706.

Primary Examiner—Carolyn E. Fields
Attorney, Agent, or Firm—Henry H. Gibson; William J. Beard

[57] ABSTRACT

Radioactive contamination on tubing is detected as the tubing is withdrawn from a wellbore. The tubing is moved past a detector located on the wellhead, preferably through an annular shaped detector, and means responsive to the detected level of radiation exceeding predetermined limits activate both an alarm to gain the operator's attention and means to apply indicia to the contaminated tubing.

10 Claims, 1 Drawing Sheet

NATURALLY OCCURRING RADIOACTIVE MATERIAL CONTAMINATION DETECTION MEANS

This is a continuation of application Ser. No. 07/950,880, filed Sep. 25, 1992, now abandoned.

BACKGROUND OF THE INVENTION

1. The Field of the Invention

The present invention relates to a method and apparatus for use in alerting operators of a drilling rig or a workover rig to the presence of radioactivity on the tubing which is being pulled from or placed into a well.

2. Description the Related Art

It is a common occurrence that when oil is pumped from a subsurface reservoir, it comes to the surface mixed with water from the formations. Water from the reservoir formations usually contains different dissolved salts which sometimes become deposited on the walls of the production tubing as well as on the surface of the production equipment. These deposits, called scale, often include sulfates of cations such as, barium, strontium, or calcium, or carbonates of cations such as, calcium or iron. The scale forms a layer the thickness of which increases with time up to the point where the scales may eventually become a problem.

More of a problem than just the formation of the scale is the content thereof since radioactive components, such as radium 226 from the Uranium decay series or radium 228 from the thorium decay series, can be present. It then becomes a problem of both detecting the presence of these radioactive materials and protecting the personnel who have to work in the immediate vicinity thereof. It is a further problem in that once such tubing is removed from a well, then there is a need to store this tubing in a manner which distinguishes the contaminated tubing from other tubing already on the surface. The thus identified tubing can subsequently be decontaminated and recycled.

The above discussed problem has been recognized, for example, as described in U.S. Pat. No. 5,038,033, the disclosure of which is incorporated herein by reference. This patent however, is directed to a method and apparatus for detecting radioactivity by a logging tool while the tubing is still in the borehole. Thus it is useful only when there is a thin buildup of scale within the tubing. A thick scale buildup might prevent passage of the sonde through the tubing thereby preventing it from making the desired readings. A somewhat related approach is found in U.S. Pat. No. 4,856,584 which concerns a method for monitoring and controlling scale formation in a well by detecting the presence of radioactivity and initiating the proper inhibiting action. Of course individual radiation exposure alarms, commonly known as dosimeters, are well known as noted for example by U.S. Pat. No. 4,695,730. Such devices are normally used by personnel that are in a potentially hazardous radioactive environment, with the dosimeter giving an indication when the personnel may have encountered unacceptably high dosage levels. However, such a device does not necessarily indicate the source of the radioactivity, since it is not sufficiently sensitive, nor are the results immediately available. In the present instance use of such a device would only indicate that the personnel may have received exposure, but it would not necessarily indicate the source of that exposure, namely, which pipe or pipes were the source of the problem.

SUMMARY OF THE INVENTION

The present invention is a method and apparatus providing radiation detection at a wellhead to monitor the radioactivity level of tubing as it is retrieved from a well and to mark any tubing which is found to have a contamination level exceeding regulatory limits.

BRIEF DESCRIPTION OF THE DRAWINGS

The present invention will now be described, by way of example, with reference to the accompanying in which:

The single FIGURE is a schematic vertical section through a well incorporating the present invention.

DETAILED DESCRIPTION OF THE INVENTION

Figure 1:
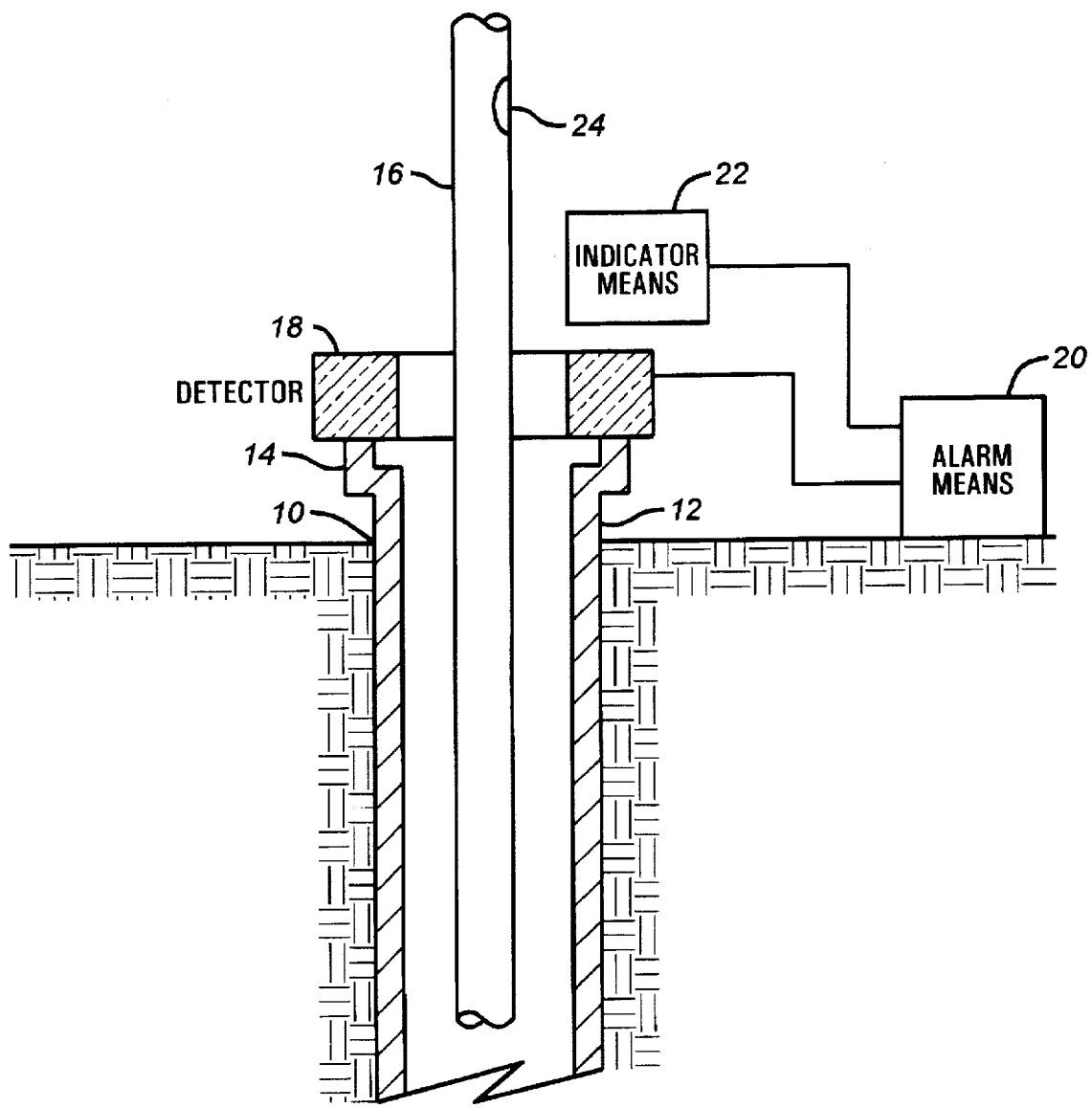

The single FIGURE schematically shows a well bore 10 which is drilled to an unspecified depth where it encounters oil or gas reservoirs, which are not shown. The top of the well is enclosed in a casing 12 and head 14 (which is only schematically shown). A string of drill pipe or production pipe 16 extends down from a working table (not shown) supported in a conventional rotary drilling rig or derrick (also not shown). The invention includes placing above the wellhead a gamma detector, here indicated as a ring shaped body 18 with the pipestring 16 passing axially there through. An alarm means 20 is connected to the gamma detector 18 and to an indicator means 22, such as a jet spray, for marking the pipe 16 with indicia 24. The alarm means can include either or both audible and visual alarms.

A suitable gamma detector is NaI(Tl) detector. The alarm device preferably includes an adjustable level control so that when the detector detects the presence of radioactivity in or on the tubing being pulled from the well, the alarm means will be activated and indicia 24 applied to the pipe by indicator means 22. The electronics for the detector 18 and alarm means 20 could be placed several feet from the detector to protect it from accidental damage during normal work on a rig. The alarm level would be set by the operator to alert him when the counts from the detector exceed a limit at which regulations require checking and/or special handling of that piece of pipe.

Tests have shown that using a 2×6 NaI crystal detector with a photomultiplier tube, power supplies, amplifier, single channel analyzer, and multichannel scaler indicate that the signal-to-noise ratio for this type of measurement would be better than 2 to 1 for a detector placed within 5 inches of the center of the tubing while the tubing is being moved at speeds of up to 1 foot per second. The optimum MCS dwell time appears to be one half to one second.

The present invention may be subject to many modifications and changes apparent to those skilled in the art without departing from the spirit or essential characteristics thereof. The present embodiment should therefore be considered in all respects as being illustrative and not restrictive of the scope of the invention as defined by the appended claim.

We claim:

1. A method for detecting radioactive scale deposited on the wall of well tubing as the tubing is removed from a well borehole, comprising the steps of:

placing a gamma ray detector producing output signals indicative of the intensity and energy of gamma rays and shaped and adapted to be placed on the wellhead and in close proximity to the point where well tubing exits the borehole as said tubing is being pulled from a well;

connecting to said detector, means responsive to said output signals, for indicating when the intensity level of said signals exceeds a predetermined level; and monitoring the intensity level of said output signals with said means for indicating when said level exceeds a predetermined level and providing an alarm indication when said predetermined level is exceeded.

2. The method of claim 1 wherein said means responsive to said output signals for indicating when the intensity level of said signal exceeds a predetermined level is responsive to gamma ray signals over a selected energy range.

3. The method of claim 2 wherein said means for indicating comprises a visual alarm indicator.

4. The method of claim 3 wherein said means for indicating marks said tubing with a visual indicia of the contamination thereof.

5. Apparatus for detecting the presence of radioactive material on the surface of tubing as the tubing is withdrawn through the wellhead from a well borehole, comprising:

a gamma ray detector shaped to be located on the wellhead and in close proximity to the tubing as it is removed from the well borehole, said detector generating output signals indicative of the intensity level and energy of gamma rays detected;

means responsive to said output signals and wherein said output signal levels are correlated to an exposure rate for detecting radiation exposure levels exceeding a predetermined safety limit; and alarm means for generating an alarm signal and for identifying said tubing causing said output signal levels exceeding a predetermined exposure safety limit, said alarm means being controlled by said means responsive to said output signals.

6. The apparatus of claim 5 wherein said gamma ray detector has a generally toroidal shape.

7. The apparatus of claim 6 wherein said detector is positioned so that the tubing passes axially through said generally toroidally shaped gamma ray detector as it is removed from the well borehole.

8. The apparatus of claim 6 wherein said detector comprises a thallium activated sodium iodide crystal.

9. The apparatus of claim 8 wherein said alarm means provides a visual alarm.

10. The apparatus of claim 9 wherein said alarm means includes means for spraying a jet spray aimed to mark the tubing with indicia indicating the presence of radioactive contamination on said tubing.

* * * * *